United States Patent
Koermer

Patent Number: 5,906,954
Date of Patent: May 25, 1999

[54] REMOVAL OF TITANIUM ATOMS FROM TITANIUM SILICATE MOLECULAR SIEVES

[75] Inventor: Gerald S. Koermer, Roseland, N.J.

[73] Assignee: Engelhard Corporation, Iselin, N.J.

[21] Appl. No.: 09/170,950

[22] Filed: Oct. 13, 1998

[51] Int. Cl.$^6$ .......................... B01D 15/00; C01B 33/36; B01J 29/04; B01J 29/06
[52] U.S. Cl. .......................... 502/60; 210/660; 210/666; 210/668; 423/700; 502/60; 502/61; 502/63; 502/64; 502/85
[58] Field of Search .............................. 423/400; 502/60, 502/61, 63, 64, 67, 85; 210/660, 666, 668

[56] References Cited

U.S. PATENT DOCUMENTS

| | | | |
|---|---|---|---|
| 5,098,687 | 3/1992 | Skeels et al. | 423/328 |
| 5,208,006 | 5/1993 | Kuznicki et al. | 423/713 |
| 5,244,650 | 9/1993 | Kuznicki et al. | 423/718 |
| 5,346,535 | 9/1994 | Kuznicki et al. | 95/96 |
| 5,374,747 | 12/1994 | Saxton et al. | 549/531 |
| 5,401,486 | 3/1995 | Mueller et al. | 423/705 |
| 5,412,122 | 5/1995 | Saxton et al. | 549/531 |
| 5,453,263 | 9/1995 | Blosser et al. | 423/713 |
| 5,618,512 | 4/1997 | Saxton et al. | 423/705 |
| 5,621,122 | 4/1997 | Saxton et al. | 549/529 |
| 5,684,170 | 11/1997 | Saxton et al. | 549/531 |
| 5,811,599 | 9/1998 | Alive et al. | 568/771 |

*Primary Examiner*—Gary P. Straub
*Assistant Examiner*—Cam N. Nguyen

[57] ABSTRACT

This invention relates to the preparation of novel titanium silicate molecular sieves with modified properties such as adsorption, ion-exchange and catalytic behavior by selective extraction of framework titanium atoms after synthesis of the sieves.

6 Claims, No Drawings

REMOVAL OF TITANIUM ATOMS FROM TITANIUM SILICATE MOLECULAR SIEVES

FIELD OF THE INVENTION

This invention relates to the preparation of novel titanium silicate molecular sieves with modified properties such as adsorption, ion-exchange and catalytic behavior by selective extraction of framework titanium atoms after synthesis of the sieves.

BACKGROUND OF THE INVENTION

ETS-10 is a novel large-pored crystalline titanium silicate described in commonly assigned U.S. Pat. No. 4,853,202. The sieve is composed of chains of titania octahedra interlinked with chains of silica tetrahedra. This type of molecular sieve has been the subject of numerous subsequent patents and publications as well as commercial activity.

ETS-10 contains octahedrally coordinated framework titanium atoms. As a result, for charge balance, each framework titanium atom is accompanied by two countercharges (e.g. two sodium cations). The chemical and physical properties of ETS-10 to a significant degree are determined by the architecture (structure) and chemical composition of the framework, the charge density of the framework and the number, type and location of the counterions.

The washed commercial product typically has a Si/Ti ratio of about 5. Pore diameter is about 8 Angstrom units. Prime commercial use has been as an adsorbent, although utility as an ion-exchange agent has been widely investigated. Efforts have been made to develop catalysts based on the ETS-10 structure. However, the available form of ETS-10 has limited utility as an oxidation catalyst, inspite of the fact that many oxidation catalysts are based on the presence of titanium atoms in molecular sieve structures.

The basic ETS-10 platform (U.S. Pat. No. 4,853,202) is flexible for substitution of both octahedral and tetrahedral atoms into the basic structure.
Reference is made to the following: S. M. Kuznicki and K. A. Thrush; U.S. Pat. No. 5,244,650 and U.S. Pat. No. 5,208,006 M. W. Anderson, A. Philippou, Z. Lin, A. Ferreira and J. Rocha; Angew. Chem. Int. Engl., 34, 1003 (1995). J. Rocha, Z. Lin, A. Ferreira and M. W. Anderson; J. Chem. Commun., 867 (1995)

SUMMARY OF THE INVENTION

I have found that certain chemical agents will selectively extract octahedral titanium from the framework of ETS-10 without significant damage to the structure, thereby changing the chemical composition, charge density and counterion density of ETS-10. The net result is that chemical physical and catalytic properties of the molecular sieve are modified.

DETAILED DESCRIPTION OF INVENTION

I have found that unique compositions can be synthesized by extraction of framework titanium from titanium silicate molecular sieves such as ETS-10 by chemical agents that have a strong affinity for complexing titanium in aqueous solution. These agents include organic chelating agents such as, but not limited to, materials such as EDTA (ethylene diamine tetraacetic acid), oxalic acid and citric acid. It is anticipated that any strong organic chelating agent for titanium would work. This includes, but is not limited to, beta diketones, any polycarboxylate or polycarbonate, amine compounds, hydroxy carboxylates or organic compounds containing combinations of chelating functional groups. In addition, inorganic materials (e.g., anions) that complex titanium strongly can be used. An example is fluoride ion which easily removes titanium from ETS-10 at acidic pHs.

The extraction process is governed by parameters such as temperature, reaction time, concentration of ETS-10 and extracting agent, rate of addition of extracting agent, pH, ion-exchange form of ETS-10, etc. The choice of reagents and reaction parameters will determine how much titanium is extracted from ETS-10. In addition, the choice of reagent and reaction parameters will determine how much extraction is done from the surface of the ETS-10 crystal. It is important to carry out this extraction at conditions that result in little or no collapse or damage (i.e. loss in crystallinity)

For example, one can deplete titanium mostly from the outer surface of the crystal. In another case, the extraction of titanium from ETS-10 crystal can be more or less uniform throughout the crystal.

If the surface of the crystal is depleted of titanium, then the surface becomes essentially hydrophobic compared to the internal part of the crystal. This can have profound impact on the adsorption and catalytic properties of the material.

It is also anticipated that the framework vacancies created by titanium extraction can be filled by other appropriate elements thereby changing the chemical and physical properties of the materials. In addition, these framework vacancies can create catalytic activity by themselves or alternatively form sites for attachment of catalytically active elements to the ETS-10 framework.

It is also anticipated that removal of titanium from the framework of ETS-10 reduces both the charge density and local charge distribution within the sieve. Both these factors should have effects on adsorptive and catalytic properties.

Removal of titanium from the framework of ETS-10 also reduces the charge on the framework and the number of exchangeable cations per unit cell of ETS-10. This will have an effect on the sorptive, catalytic and ion-exchange behavior of ETS-10. For example, the acidic properties of HETS-10 would be affected by the removal of significant amounts of titanium from the framework.

It is anticipated that the procedures disclosed here for Ti removal from ETS-10 can be applied to other ETS phases and ETS-10 like phases wherein the titanium atoms that are removed are in octahedral coordination. These phases include, but are limited to, ETS-4, U.S. Pat. No. 4,938,939, ETS-11, ETS-14, zorite, gallium substituted ETS-10, etc.

In addition, it is expected that the procedures disclosed here for Ti removal from ETS-10 may be applied to titanium containing molecular sieves where the Ti atoms are tetrahedrally coordinated. This includes molecular sieves such as TS-1, TS-2, Ti-Beta and others.

EXAMPLE 1

Titanium removal from ETS-10 is accomplished using the following procedure: 33 g of Na/K form ETS-10 is slurried in 150 ml deionized water. 12 g of citric acid is dissolved in 100 ml water. The citric acid solution is added to the ETS10 slurry and the resulting mixture is heated to reflux for 4 h. The reaction mixture is cooled and filtered. The resulting solid is reslurried in enough water to make a 20% solids slurry and the slurry is stirred for 0.5 h. The solid is filtered and then dried at 90 deg. C. In this example, the starting Si/Ti ratio for ETS-10 is 5. The Si/Ti ratio after extraction increases to 5.72 which corresponds to removal of approximately 12% of the titanium. XRD (X-Ray Diffraction)

analysis is consistent with H+/ETS-10, so the long range order has not been disturbed. In addition, surface area measurements and XRD indicate little or no formation of amorphous phases.

EXAMPLE 2

This example shows that other chelating agents may be used. 33 g of Na/K ETS-10 was slurried in 440 ml water. 5.6 g oxalic acid was dissolved in 90 ml water and the resulting solution was placed in a syringe pump. The ETS-10 slurry was heated to reflux with stirring. The oxalic acid was added dropwise over 4 h. After addition was complete, the slurry was heated overnight. Finally, the slurry was cooled and filtered. The solid was reslurried in water and stirred for 0.5 h, then filtered and dried at 90 deg. C for 2 h. The resulting solid had a bulk Si/Ti of 5.84. XRD and surface area analysis were consistent with H+ETS-10. XPS analysis of the surface Si/Ti ratio was 14.3. Thus, the sample is relatively Ti depleted on the surface of the crystal.

EXAMPLE 3

This example illustrates that inorganic materials can remove Ti from the framework of ETS-10. 15 g of Na/K form ETS-10 with a Si/Ti of 5.17 was slurried in 75 ml water. 6 g of ammonium fluoride was dissolved in 15 ml water. The solution of ammonium fluoride was added slowly to the ETS-10 slurry. After addition of the fluoride was complete, the pH of the slurry was adjusted to 4 with dilute nitric acid. After stirring for 1 h, the mixture was filtered, reslurried in water and filtered again. The resulting solid was dried at 90 deg C. for 2 h. The fluoride treated material had a Si/Ti of 5.84 indicating removal of Ti from ETS-10 (approximately 14%).

EXAMPLE 4

This example illustrates that other ion exchange forms of ETS-10 can be substrates for titanium extraction. Ammonium form ETS-10 with a Si/Ti of approximately 5 was prepared by successive treatment of Na/K ETS-10 with acidic ammonium nitrate solution. 34.1 g of this material was slurried in 440 ml water. 12.8 g citric acid was dissolved in 60 ml water. The slurry of ETS-10 was heated to reflux and the citric acid solution was fed to the slurry at 0.5 ml/min. After addition was complete, the slurry was heated for an additional 2 h. The solid was recovered by filtration. After washing the Si/Ti of the resulting solid was 5.45.

EXAMPLE 5

This example illustrates that Ti extraction gradients across the crystal can be minimized. $12.8$ g of citric acid was dissolved in 60 ml water. 34. Ig of Na/K ETS-10 with Si/Ti of 5.17 was slurried in 1940 ml water. The slurry of ETS-10 was heated to reflux and the citric acid solution was fed to the slurry at 0.5 ml/min. After addition was complete, the slurry was heated for an additional 2 h. The solid was recovered by filtration. Elemental analysis gave a bulk Si/Ti of 5.8. XPS analysis indicates a Si/Ti of 6.5 at the crystal surface. Thus, Ti extraction gradients through the crystal are minimized.

EXAMPLE 6

All catalytic reactions were done in a 50 cc stirred autoclave with a teflon liner. Solvent (30 ml) and reactant were added or bubbled through the solvent to saturate the solvent. The catalyst and hydrogen peroxide were quickly added and the autoclave was sealed. The autoclave was heated to reaction temperature for a specified period of time and then the autoclave was cooled. The reaction mixture was filtered to remove the catalyst and the liquid phase was analyzed by a gas chromatographic/mass spectrometer (ion-chromatogram). This analysis separated and identified products. The catalyst used in all cases was ETS-10 with Ti removed by the techniques described above.

In this example, trans 2-butene is reacted to a mixture of 1,3 and 2,3 butanediol. Acetone was saturated with trans butene and mixed with 1.0 g of 30% hydrogen peroxide and 0.5 g catalyst. The mixture was heated to 90 C. for 4 hours. The resulting products were 1,3 and 2,3 butanediol.

EXAMPLE 7

In this example, allyl alcohol is the substrate. 1.0 g of allyl alcohol, 1.0 g of 30% hydrogen peroxide and 0.5 g of catalyst were mixed with acetonitrile and the resulting mixture was heated to 90 C. for 4 hours in the autoclave. The resulting products were 3-hydroxypropanal and unknowns.

EXAMPLE 8

In this example propene is the substrate. Acetonitrile was saturated with propene and mixed with 1.0 g of 30% hydrogen peroxide and 0.5 g of catalyst. The mixture was heated to 85 C. for 3 hours. A mixture of 1, 2 propanediol and propylene oxide resulted.

Removal of titanium from the framework of ETS-10 creates sites that are catalytically active for the oxidation of organic compounds in the presence of peroxides. In addition, as noted above, I anticipate that ETS-10 with titanium removed will have altered adsorption and ion-exchange properties which could be exploited in various commercial applications.

Furthermore, ETS-10 with titanium removed may serve as a support for catalysts and as a substrate for further modification of ETS-10 (e.g., isomorphic replacement).

EXAMPLE 9

In a round bottom flask with condenser and stirring bar were placed 24 g acetonitrile, 1.0 g of 30% aqueous hydrogen peroxide, and 32 millimoles of cyclohexene. The solution was heated to reflux and 0.5 g of titanium extracted ETS-10 (see above) was added. The resulting yellow slurry is heated for 4 h with vigorous stirring. The reaction mixture is cooled and filtered. The filtrate is analyzed by gas-chromatography/mass spectroscopy. In addition it was titrated for peroxide.

Analysis indicates that more than 80% of the starting peroxide was reacted. Conversion of cylcohexene was approximately 25–30%. Selectivity to oxidation products was: cyclohexenone 25%, cyclohexen-3-ol 27% and cyclobexanediol 36%.

EXAMPLE 10

In a round bottom flask with condenser and stirring bar were placed 24 g acetonitrile, 1.0 g of 30% aqueous hydrogen peroxide, and 32 millimoles of cyclopentene. The solution was heated to reflux and 0.5 g of titanium extracted ETS-10 (see above) was added. The resulting yellow slurry is heated for 4 h with vigorous stirring. The reaction mixture is cooled and filtered. The filtrate is analyzed by gas-chromatography/mass spectroscopy. In addition it is titrated for peroxide.

Analysis indicated more than 80% of the starting peroxide reacted. Conversion of cyclopentene was estimated at 5–10%. Selectivity to oxidation products was: cyclopenteneoxide 12%, cyclopentenone 11%, cyclopentenol 22% and cyclopentenediol 10%.

EXAMPLE 11

In a round bottom flask with condenser and stirring bar were placed 24 g acetonitrile, 1.0 g of 30% aqueous hydrogen peroxide, and 32 millimoles of ethylbenzene. The solution was heated to reflux and 0.5 g of titanium extracted ETS-10 (see above) was added. The resulting yellow slurry is heated for 4 h with vigorous stirring. The reaction mixture is cooled and filtered. The filtrate is analyzed by gas-chromatography/mass spectroscopy. In addition it is titrated for peroxide.

Analysis indicated more than 80% of the starting peroxide reacted. Conversion of ethylbenzene was estimated at 5–10%. Selectivity to oxidation products was: acetophenone 56%, and 1-phenylethanol 20%.

EXAMPLE 12

In a round bottom flask with condenser and stirring bar were placed 24 g acetonitrile, 1.0 g of 30% aqueous hydrogen peroxide, and 32 millimoles of p-xylene. The solution was heated to reflux and 0.5 g of titanium extracted ETS-10 (see above) was added. The resulting yellow slurry is heated for 4 h with vigorous stirring. The reaction mixture is cooled and filtered. The filtrate is analyzed by gas-chromatography/mass spectroscopy. In addition it was titrated for peroxide.

Analysis of the reaction mixture indicated that >80% of the peroxide had reacted. Conversion of p-xylene is estimated at 5–10%. Selectivity to oxidized products was: 4-methylbenzaldehyde 64%, 4-methyl benzyl alcohol approximately 20% and 15% unidentified.

EXAMPLE 13

This example illustrates that it is possible to do multiple extractions of titanium from the ETS-10 structure. A slurry of 51 g of Na/K ETS-10 and 750 ml water was heated to 82.5 C. with stirring. A solution of 14.4 g of citric acid in 60 ml water was added to the slurry at a rate of 0.5 ml/minute using a syringe pump. After all the citric acid solution was added, the slurry was stirred an additional 2.5 h. The slurry was cooled and filtered. The filter cake was reslurried in 300 ml water, filtered and dried at 90 C. Elemental analysis indicated the bulk Si/Ti ratio was 5.6. The Ti extraction procedure was repeated on a portion of the product of the first extraction. After filtration, washing and drying, the Si/Ti ratio increased to 6.7. XRD and surface area measurements indicated the ETS-10 structure has remained intact.

I claim:

1. A method for modifying a titanium silicate molecular sieve wherein titanium is present as framework atom which comprises selectively extracting a portion of the titanium atoms without destroying the framework structure by complexing said titanium atom with a complexing agent selected from the group consisting of EDTA, oxalic, citric, beta diketones, amines, and hydroxy carboxylates.

2. The method of claim 1 wherein the titanium that is extracted was in octahedral coordination.

3. The method of claim 1 wherein the titanium that is extracted was in tetrahedral coordination.

4. The method of claim 2 wherein the molecular sieve is ETS-10.

5. The method of claim 4 wherein said complexing agent is selected from the group consisting of ethylene diamine tetraacetic acid, oxalic acid and citric acid.

6. The method of claim 1 wherein molecular sieve is ETS-10 and said complexing agent is selected from the group consisting of ethylene diamene tetraacetic acid, oxalic acid and citric acid.

* * * * *